(12) United States Patent
Tsujimoto et al.

(10) Patent No.: US 8,511,068 B2
(45) Date of Patent: Aug. 20, 2013

(54) TEMPERATURE RAISING SYSTEM FOR AN EXHAUST GAS PURIFICATION CATALYST

(75) Inventors: Kenichi Tsujimoto, Susono (JP); Mikio Inoue, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 54 days.

(21) Appl. No.: 13/260,052

(22) PCT Filed: Apr. 2, 2009

(86) PCT No.: PCT/JP2009/056895
§ 371 (c)(1),
(2), (4) Date: Sep. 23, 2011

(87) PCT Pub. No.: WO2010/113311
PCT Pub. Date: Oct. 7, 2010

(65) Prior Publication Data
US 2012/0017572 A1      Jan. 26, 2012

(51) Int. Cl.
    *F01N 3/00*          (2006.01)
(52) U.S. Cl.
    USPC ............ 60/286; 60/287; 60/300; 60/303; 60/602; 60/606
(58) Field of Classification Search
    USPC ...... 60/274–324, 602, 606, 605.1; 123/559.1
    See application file for complete search history.

(56) References Cited

U.S. PATENT DOCUMENTS

| | | | |
|---|---|---|---|
| 4,444,012 A * | 4/1984 | Gauffres | 60/602 |
| 5,067,320 A | 11/1991 | Kanesaki | |
| 6,895,745 B2 * | 5/2005 | Roby | 60/280 |
| 2005/0188682 A1 * | 9/2005 | Fledersbacher et al. | 60/284 |
| 2006/0059910 A1 * | 3/2006 | Spaeder et al. | 60/612 |
| 2007/0251216 A1 * | 11/2007 | Easley et al. | 60/285 |
| 2008/0264045 A1 * | 10/2008 | Hara et al. | 60/295 |
| 2011/0203261 A1 * | 8/2011 | Kotrba et al. | 60/285 |
| 2012/0036847 A1 * | 2/2012 | Schreiber et al. | 60/602 |
| 2012/0315192 A1 * | 12/2012 | Tsujimoto | 422/109 |

FOREIGN PATENT DOCUMENTS

| | | |
|---|---|---|
| CN | 1330215 A | 1/2002 |
| CN | 1540143 A | 10/2004 |
| JP | 58 111310 | 7/1983 |
| JP | 61 112718 | 5/1986 |
| JP | 2 196120 | 8/1990 |
| JP | 2002 47922 | 2/2002 |

OTHER PUBLICATIONS

International Search Report Issued Jun. 23, 2009 in PCT/JP09/056895 Filed Apr. 2, 2009.

* cited by examiner

*Primary Examiner* — Thomas Denion
*Assistant Examiner* — Jesse Bogue
(74) *Attorney, Agent, or Firm* — Oblon, Spivak, McClelland, Maier & Neustadt, L.L.P.

(57) ABSTRACT

A technique is provided which is capable of reducing an amount of smoke generated in a temperature raising system in which fuel added to an exhaust gas flowing through an exhaust passage is caused to combust at the time of requesting a temperature rise in an exhaust gas purification catalyst. When a request for raising the temperature of an exhaust gas purification catalyst is made, bypass control is carried out in which the exhaust gas having bypassed a turbine is caused to flow into the exhaust gas purification catalyst through a bypass passage, and fuel ignition control is carried out in which a fuel addition valve is caused to add fuel to the exhaust gas which has flowed out of the turbine, and a glow plug is caused to ignite the added fuel.

2 Claims, 8 Drawing Sheets

TEMPERATURE RAISING SYSTEM FOR AN EXHAUST GAS PURIFICATION CATALYST

TECHNICAL FIELD

The present invention relates to a temperature raising system for an exhaust gas purification catalyst for purifying an exhaust gas of an internal combustion engine.

BACKGROUND ART

As a technique to raise the temperature of an exhaust gas purification catalyst in an internal combustion engine, raising the temperature of an exhaust gas flowing into the exhaust gas purification catalyst is carried out. In a Patent Document 1, there is disclosed a technique in which outside air is introduced to a combustion heater which is provided with a fuel addition valve and an ignition device, and a combustion gas generated by the combustion of a mixed gas of the outside air and fuel is guided to an exhaust gas purification catalyst.

PRIOR ART DOCUMENTS

[Patent Documents]
Patent Document 1: Japanese patent application laid-open No. 2002-47922

SUMMARY OF THE INVENTION

Problem to be Solved by the Invention

However, as in the above-mentioned conventional technique, a temperature raising system in which outside air is introduced to a combustion heater has its structure complicated. In contrast to this, a technique in which a fuel addition valve and an ignition device are arranged in an exhaust passage at a location upstream of an exhaust gas purification catalyst, so that fuel added from the fuel addition valve to an exhaust gas is ignited to be burned is effective in making a temperature raising system compact. In this case, however, the higher the temperature of a mixed gas to which an added fuel has been added, the higher the temperature of a combustion gas at the time of combustion of the added fuel becomes. For that reason, if the temperature of the mixed gas becomes high too much, there will be a fear that the generation of a large amount of smoke may be caused, thus deteriorating exhaust emission.

The present invention has been made in view of the above-mentioned actual circumstances, and has for its object to provide a technique which is capable of reducing the amount of smoke generated in a temperature raising system in which fuel added to an exhaust gas flowing through an exhaust passage is caused to combust at the time when a request for raising the temperature of an exhaust gas purification catalyst is made.

Means for Solving the Problem

A temperature raising system for an exhaust gas purification catalyst according to the present invention in order to achieve the above-mentioned object adopts the following measures.

That is, a temperature raising system for an exhaust gas purification catalyst is characterized by comprising: a turbine that is arranged in an exhaust passage of an internal combustion engine; an exhaust gas purification catalyst that is arranged in a portion in said exhaust passage at the downstream side of said turbine; a bypass passage that connects a portion in said exhaust passage between said turbine and said exhaust gas purification catalyst and a portion therein at the upstream side of said turbine with each other; a fuel addition valve that is arranged in a portion in said exhaust passage between a downstream side connection portion connected with said bypass passage and said turbine, and adds fuel to an exhaust gas flowing through said exhaust passage; an ignition device that is arranged in a portion in said exhaust passage between said downstream side connection portion and said turbine, and ignites the added fuel which has been added by said fuel addition valve; a first temperature raising control unit that causes the exhaust gas having bypassed said turbine to flow into said exhaust gas purification catalyst through said bypass passage, at the time when a request for raising the temperature of said exhaust gas purification catalyst is made; and a second temperature raising control unit that executes fuel ignition control in which said fuel addition valve is caused to add fuel to the exhaust gas which has flowed out of said turbine, and said ignition device is caused to ignite the added fuel, at the time when the request for raising the temperature of said exhaust gas purification catalyst is made.

In the above-mentioned construction, a part of the exhaust gas discharged from the internal combustion engine flows into the bypass passage, and the remaining exhaust gas flows into the turbine. A part of the energy of the exhaust gas flowing into the turbine is consumed so as to supercharge intake air. As a result, the temperature of the exhaust gas after having flowed out of the turbine falls in comparison with that before flowing into the turbine.

On the other hand, the exhaust gas flowing into the bypass passage bypasses the turbine, so it is introduced into the exhaust gas purification catalyst while being maintained at high temperature. In the present invention, it is possible to raise the temperature of the exhaust gas purification catalyst in an efficient manner by causing the exhaust gas of high temperature having bypassed the turbine to flow into the exhaust gas purification catalyst through the bypass passage, at the time when a request for raising the temperature of the exhaust gas purification catalyst is made. Accordingly, it becomes possible to decrease an amount of fuel addition in fuel ignition control in a suitable manner, thus making it possible to decrease an amount of generation of smoke.

In addition, the fuel addition valve and the ignition device are both arranged in the portion in the exhaust passage between the turbine and the downstream side connection portion. The "downstream side connection portion" means that one of connection portions in the exhaust passage connected with the bypass passage, which is located at the downstream side of the turbine. In this manner, by arranging the fuel addition valve and the ignition device at the downstream side of the turbine, it is possible to cause the temperature of a fuel gas at the time of fuel ignition control to fall in a suitable manner, thus making it possible to suppress the generation of smoke.

Moreover, the temperature raising system of the above-mentioned construction may be further provided with an inflow ratio changing device that is able to change a bypass inflow ratio, which is a ratio of an amount of exhaust gas flowing into said bypass passage with respect to a total amount of exhaust gas discharged from said internal combustion engine, and a turbine inflow ratio, which is a ratio of an amount of exhaust gas flowing into said turbine with respect to the total amount of exhaust gas. Then, said first temperature raising control unit may control said inflow ratio changing device in such a manner that the turbine inflow ratio at the time when fuel ignition control is carried out becomes larger in comparison with the bypass inflow ratio, and may also control said inflow ratio changing device in such a manner that the bypass inflow ratio after the fuel ignition control has been carried out becomes larger in comparison with the turbine inflow ratio.

According to this, at the time of the execution of fuel ignition control, the amount of exhaust gas passing through the ignition device per unit time increases, so it is possible to cause the temperature of a combustion gas in fuel ignition control to fall in a reliable manner. On the other hand, after the execution of the fuel ignition control, a much larger amount of exhaust gas of high temperature having bypassed the turbine can be introduced into the exhaust gas purification catalyst. As a result of this, even after the execution of the fuel ignition control has ended, it is possible to raise the temperature of the exhaust gas purification catalyst in a continuous manner.

Here, it is to be noted that the measures for solving the problems in the present invention can be used in combination as much as possible.

ADVANTAGEOUS EFFECT OF THE INVENTION

In the present invention, it is possible to provide a technique which is capable of reducing the amount of smoke generated in a temperature raising system in which fuel added to an exhaust gas flowing through an exhaust passage is caused to combust at the time when a request for raising the temperature of an exhaust gas purification catalyst is made.

EMBODIMENTS FOR CARRYING OUT THE INVENTION

Hereinafter, modes for carrying out the present invention will be described in detail by way of example with reference to the attached drawings. Here, note that the dimensions, materials, shapes, relative arrangements and so on of component elements described in practical forms of the present invention are not intended to limit the technical scope of the present invention to these alone in particular as long as there are no specific statements. Hereinafter, reference will be made to specific embodiments of an exhaust system of an internal combustion engine according to the present invention.

<First Embodiment>

Figure 1:
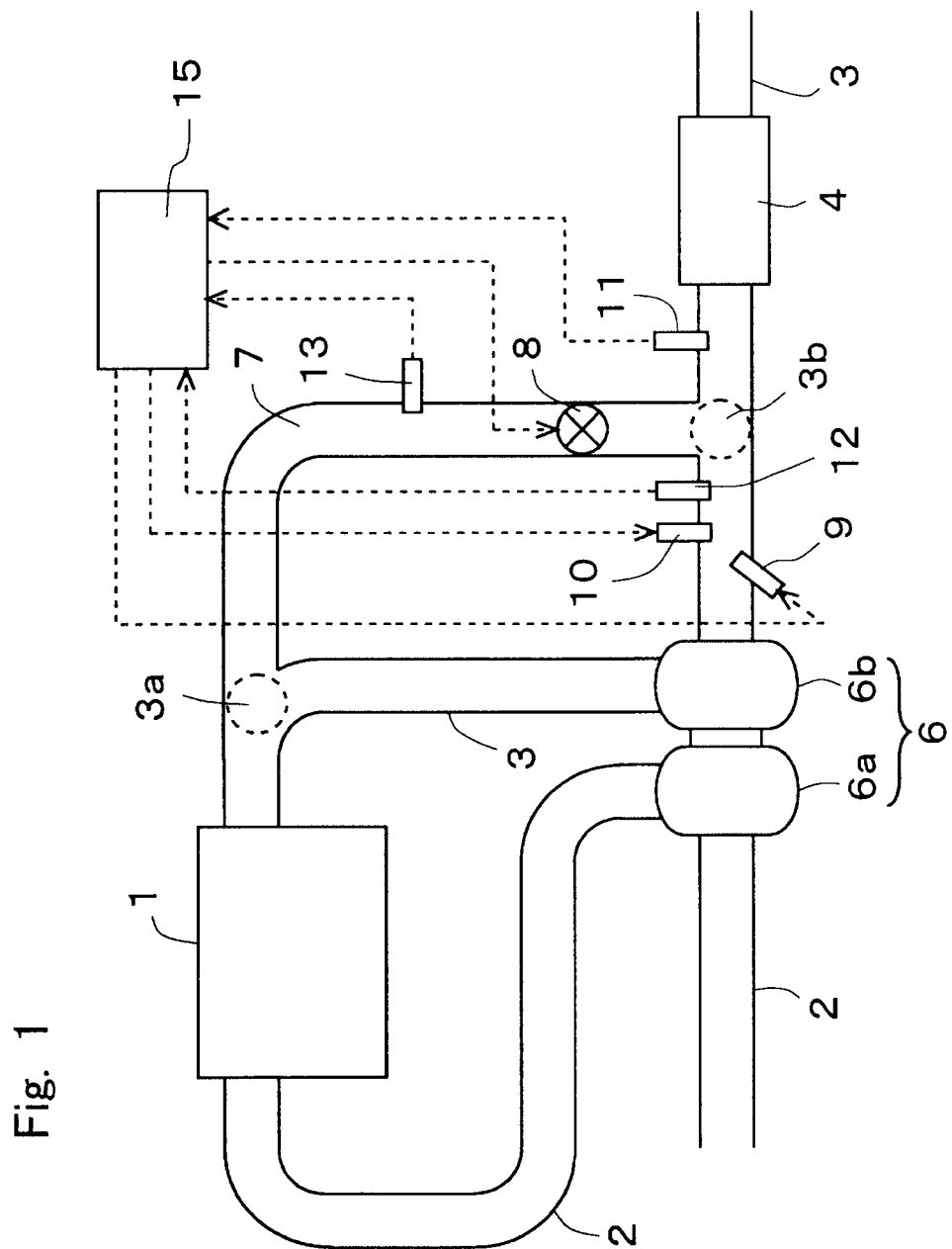
FIG. 1 IS A VIEW SHOWING THE SCHEMATIC CONSTRUCTION OF AN INTERNAL COMBUSTION ENGINE AND ITS INTAKE AND EXHAUST SYSTEMS TO WHICH A TEMPERATURE RAISING SYSTEM FOR AN EXHAUST GAS PURIFICATION CATALYST ACCORDING TO A FIRST EMBODIMENT OF THE PRESENT INVENTION IS APPLIED.

FIG. 1 is a view showing the schematic construction of an internal combustion engine and its intake and exhaust systems to which a temperature raising system for an exhaust gas purification catalyst in this first embodiment of the present invention is applied. The internal combustion engine 1 is a diesel engine for driving a An intake passage 2 and an exhaust passage 3 are connected to the internal combustion engine 1. A turbocharger 6 has a compressor 6a arranged in the intake passage 2. The turbocharger 6 has a turbine 6b arranged in the exhaust passage 3. A NOx purification catalyst 4 is arranged in the exhaust passage 3 at the downstream side of the turbine 6b.

As the exhaust gas purification catalyst 4 in this embodiment, a DPNR (Diesel Particulate NOx Reduction) catalyst is adopted which serves to support an NOx storage reduction catalyst (hereinafter, referred to as a "NOx catalyst"), and to oxidize and remove particulates such as soot in an exhaust gas. Here, the NOx catalyst has a function of occluding NOx contained in the exhaust gas when an ambient atmosphere is in a state of a high oxygen concentration, and of reducing the occluded NOx when the ambient atmosphere is in a state of a low oxygen concentration, and when a reducing component exists. Here, note that as this exhaust gas purification catalyst 4, there may be adopted other catalysts which do not have NOx occlusion ability, such as a selective reduction type NOx catalyst, a three-way catalyst, etc.

The portion in the exhaust passage 3 between the turbine 6b and the exhaust gas purification catalyst 4, and the portion therein at the upstream side of the turbine 6b are connected with each other by means of a bypass passage 7. In addition, in the bypass passage 7, there is arranged a bypass valve 8 which is able to adjust the passage sectional area of the exhaust gas in the bypass passage 7. When the degree of opening of the bypass valve 8 is changed, the amount of exhaust gas passing through the bypass passage 7 changes. Accordingly, by changing the degree of opening of the bypass valve 8, a bypass inflow ratio Rbp, which is a ratio of an amount of exhaust gas flowing into the bypass passage 7 among a total amount of exhaust gas discharged from the internal combustion engine 1, and a turbine inflow ratio Rtb, which is a ratio of an amount of exhaust gas flowing into the turbine 6b among the total amount of exhaust gas, can be changed. The bypass valve 8 in this embodiment corresponds to an inflow ratio changing device in the present invention.

Among connection portions between the exhaust passage 3 and the bypass passage 7, a connection portion located at the upstream side of the turbine 6b is referred to as a "bypass branch portion 3a", and a connection portion located at the downstream side of the turbine 6b is referred to as a "bypass merge portion 3b". In cases where the bypass inflow ratio Rbp and the turbine inflow ratio Rtb are equal to each other, the amount of exhaust gas, which flows into the side of the turbine 6b in the bypass branch portion 3a, and the amount of exhaust gas, which flows into the side of the bypass passage 7, become exactly equal to each other. Here, note that, it always becomes the sum of the bypass inflow ratio Rbp and the turbine inflow ratio Rtb one.

In this embodiment, a fuel addition valve 9, which serves to add fuel to the exhaust gas having flowed out of the turbine 6b, is arranged in a portion in the exhaust passage 3 between the turbine 6b and the bypass merge portion 3b. In addition, in a portion in the exhaust passage 3 between the fuel addition valve 9 and the bypass merge portion 3b, there is arranged a glow plug 10 which generates heat by the supply of electric power from a battery (illustration omitted), and ignites the fuel added from the fuel addition valve 9. In this embodiment, the glow plug 10 corresponds to an ignition device in the present invention. Also, the bypass merge portion 3b corresponds to a "downstream side connection portion" in the present invention.

A first temperature sensor 11, a second temperature sensor 12, and a third temperature sensor 13, each of which outputs an electrical signal corresponding to the temperature of the exhaust gas, are arranged in a portion in the exhaust passage 3 between the bypass merge portion 3b and the exhaust gas purification catalyst 4, in a portion in the exhaust passage 3 in the periphery of the glow plug 10, and in a portion in the bypass passage 7 between the bypass valve 8 and the bypass branch portion 3a, respectively.

In the internal combustion engine 1, there is arranged in combination therewith an electronic control unit (ECU: Electronic Control Unit) 15 for controlling the internal combustion engine 1. This ECU 15 controls the operating state of the internal combustion engine 1, etc., in accordance with the operating conditions of the internal combustion engine 1 and/or driver's requirements. In addition, besides the first temperature sensor 11 through the third temperature sensor 13, a variety of kinds of sensors (a crank position sensor which detects the number of engine revolutions per unit time, an accelerator position sensor which detects an accelerator opening, an air flow meter which measures an amount of air flowing through the intake passage 2, etc.), which detect the operating state of the internal combustion engine 1, are connected to the ECU 15 through electrical wiring, so that their output signals are inputted to the ECU 15. Also, besides the bypass valve 8, the fuel addition valve 9 and the glow plug 10, in-cylinder fuel injection valves (illustration omitted), which directly inject the fuel to be supplied for engine combustion into the interiors of cylinders, respectively, are connected to the ECU 15 through electrical wiring, so that they are controlled by means of the ECU 15.

The ECU 15 carries out temperature raising processing to raise a temperature (hereinafter referred to as a "catalyst temperature") TC of the exhaust gas purification catalyst 4 at the time of a request to raise the temperature of the exhaust gas purification catalyst 4. The temperature raising processing of this embodiment is the processing which raises the catalyst temperature TC to a temperature-raising target temperature TCt by raising the temperature (hereinafter referred to as an "inflow gas temperature") TGc of the exhaust gas flowing into the exhaust gas purification catalyst 4. Here, the temperature-raising target temperature TCt means a target temperature of the exhaust gas purification catalyst 4 at the time of carrying out the temperature raising processing, and for example, a temperature which is an activation temperature of the exhaust gas purification catalyst 4 added by a predetermined margin can be adopted as the temperature-raising target temperature TCt. In addition, the request to raise the temperature of the exhaust gas purification catalyst 4 may also be made when the catalyst temperature TC is lower than the activation temperature of the exhaust gas purification catalyst 4.

In the temperature raising processing, the ECU 15 carries out control (hereinafter referred to as "fuel ignition control") in which fuel is added to the exhaust gas from the fuel addition valve 9, and the added fuel is ignited by energizing the glow plug 10. According to this fuel ignition control, the inflow gas temperature TGc rises due to the combustion of the added fuel, so the catalyst temperature TC can be raised in a suitable manner. Here, note that in this description, the term "added fuel" means the fuel added to the exhaust gas from the fuel addition valve 9, and is used separately from the fuel injected from the in-cylinder fuel injection valves which are arranged in individual cylinders for engine combustion.

Here, in cases where other conditions are equal, the more the amount of fuel addition in the fuel ignition control, the more the amount of rise of the inflow gas temperature TGc increases, so the amount of rise of the catalyst temperature TC also increases. However, when the amount of fuel addition in the fuel ignition control increases, the temperature of combustion gas at the time of combustion of added fuel becomes high, thus causing an increase in the amount of smoke generation.

Figure 2:
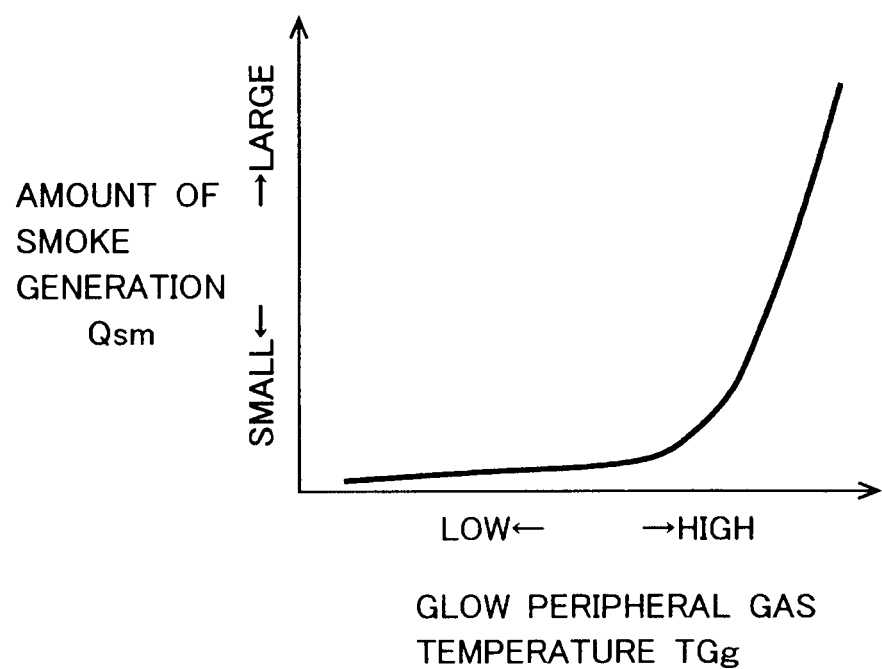
FIG. 2 IS A VIEW ILLUSTRATING, BY WAY OF EXAMPLE, THE RELATION BETWEEN A GLOW PERIPHERAL GAS TEMPERATURE TGG AND AN AMOUNT OF SMOKE GENERATION QSM AT THE TIME OF FUEL IGNITION CONTROL.

FIG. 2 is a view illustrating, by way of example, the relation between a glow peripheral gas temperature TGg and an amount of smoke generation Qsm at the time of fuel ignition control. The "glow peripheral gas temperature TGg" is the temperature of the exhaust gas which flows through the periphery of the glow plug 10. In cases where other conditions are equal, the higher the temperature of the glow peripheral gas temperature TGg, the higher the temperature of combustion gas at the time of combustion of the added fuel becomes. Accordingly, the higher the temperature of the glow peripheral gas temperature TGg, the more the amount of smoke generation Qsm in the fuel ignition control tends to increase.

Accordingly, in the temperature raising processing, the temperature of the exhaust gas purification catalyst 4 is caused to rise, while trying to decrease the amount of smoke generation Qsm in the fuel ignition control. Specifically, by opening the bypass valve 8, the ECU 15 carries out the control of causing an exhaust gas of a high temperature having bypassed the turbine 6b to flow into the exhaust gas purification catalyst 4 by way of the bypass passage 7 (hereinafter referred to as "bypass control"), in combination with the fuel ignition control.

When bypass control is carried out, a part of the exhaust gas discharged from the internal combustion engine flows into the bypass passage 7 from the bypass branch portion 3a, and the remaining exhaust gas flows into the turbine 6b. A turbine wheel (illustration omitted), which is rotatably supported on a shaft, is arranged in the inside of the turbine 6b, and this turbine wheel is driven to rotate by the energy of the exhaust gas flowing into the turbine 6b. The rotational torque of the turbine wheel is transmitted to a compressor wheel (illustration omitted) which is rotatably supported on a shaft in the inside of the compressor 6a, so that the air flowing into the compressor 6a is compressed. In other words, when exhaust gas flows into the turbine 6b, a part of the energy thereof is consumed so as to supercharge the intake air. Accordingly, the temperature of the exhaust gas after it has flowed out of the turbine 6b falls as compared with that before it flows into the turbine 6b.

Figure 3:
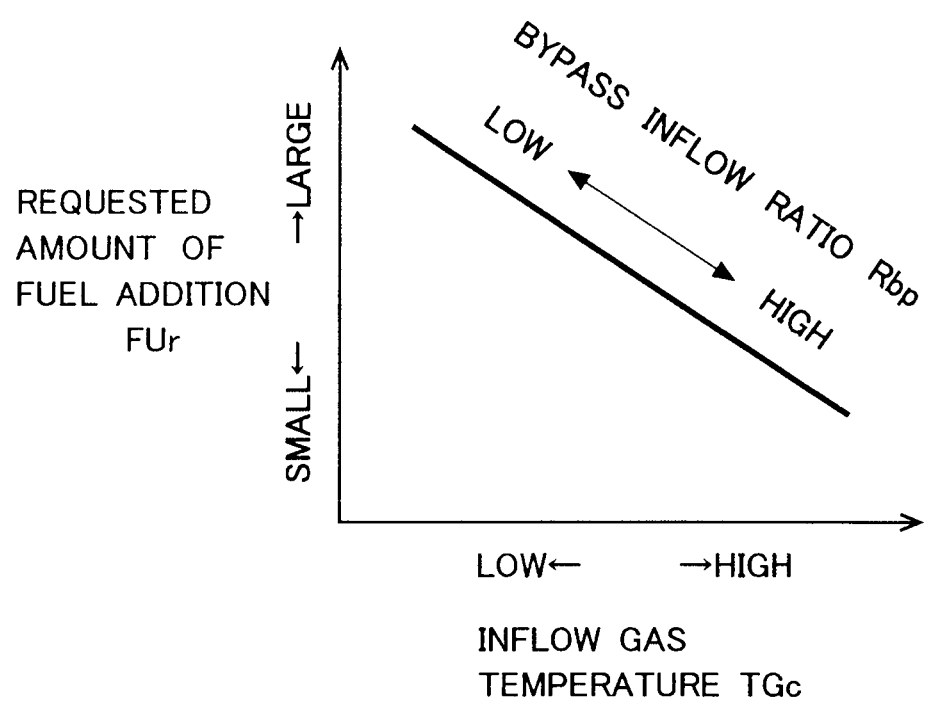
FIG. 3 IS A MAP ILLUSTRATING, BY WAY OF EXAMPLE, THE RELATION BETWEEN AN INFLOW GAS TEMPERATURE TGC AT THE TIME OF BYPASS CONTROL, AND A REQUESTED AMOUNT OF FUEL ADDITION FUR AT THE TIME OF FUEL IGNITION CONTROL.

On the other hand, the exhaust gas flowing by way of the bypass passage 7 in the bypass control bypasses the turbine 6b, so that it is introduced into the exhaust gas purification catalyst 4 while being maintained at high temperature. FIG. 3 is a map illustrating, by way of example, the relation between the inflow gas temperature TGc at the time of bypass control, and an amount of fuel addition (hereinafter referred to as a "requested amount of fuel addition") FUr requested in the fuel ignition control. Here, the higher the bypass inflow ratio Rbp at the time of bypass control, the more the inflow gas temperature TGc rises up, so the catalyst temperature TC comes near the temperature-raising target temperature TCt. For that reason, the higher the bypass inflow ratio Rbp at the time of the bypass control, the more the requested amount of fuel addition FUr in the fuel ignition control is decreased.

The ECU 15 carries out bypass control before fuel ignition control. In the bypass control, the ECU 15 adjusts the degree of opening of the bypass valve 8 in such a manner that the bypass inflow ratio Rbp becomes at least larger as compared with the turbine inflow ratio Rtb (i.e., it becomes a value larger than 0.5). As a result, the rise of the inflow gas temperature TGc in the bypass control and the decrease of the requested amount of fuel addition FUr in the fuel ignition control are facilitated. Accordingly, the temperature of combustion gas related to the fuel ignition control falls, and the amount of smoke generation Qsm is decreased.

In addition in this embodiment, the fuel addition valve 9 and the glow plug 10 are arranged between the turbine 6b and the bypass merge portion 3b in the exhaust passage 3. According to such a temperature raising system, it is possible to make the glow peripheral gas temperature TGg at the time of the fuel ignition control lower to a remarkable extent as compared with a system in which the fuel addition valve 9 and the glow plug 10 are arranged at the upstream side of the turbine 6b. As a result of this, the temperature of combustion gas in the fuel ignition control becomes low, so the amount of smoke generation Qsm can be decreased.

Figure 4:
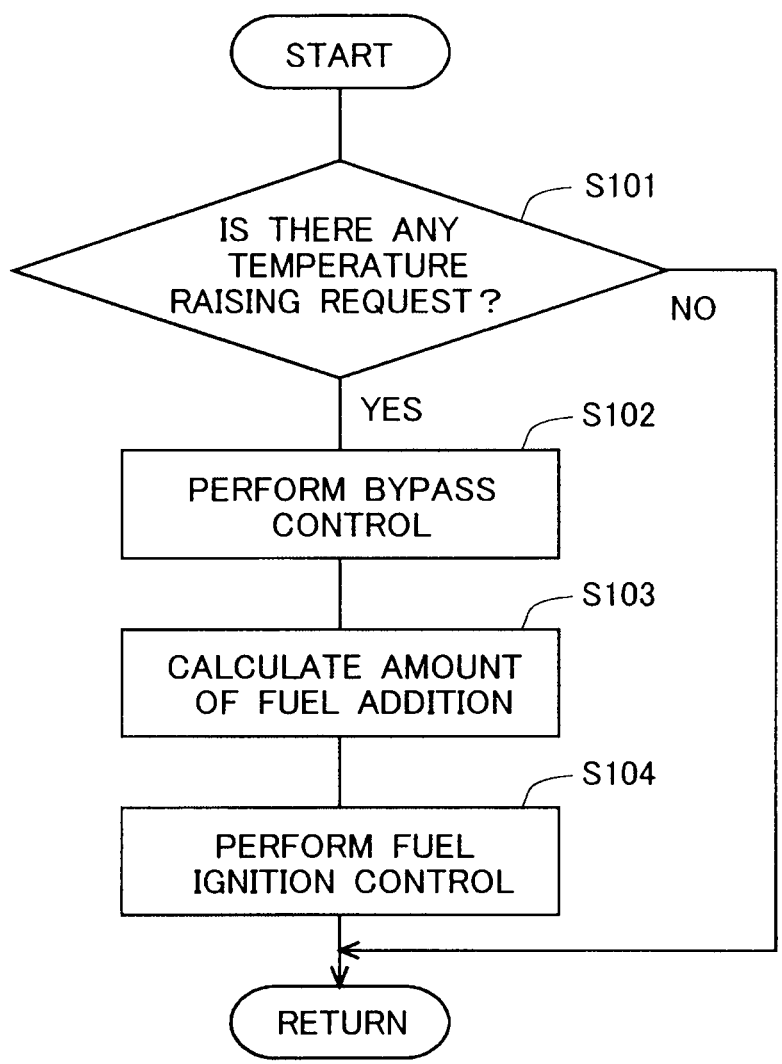
FIG. 4 IS A FLOW CHART VIEW SHOWING A FIRST TEMPERATURE RAISING PROCESSING ROUTINE.

Hereinafter, reference will be made to the specific content of the temperature raising processing with respect to the exhaust gas purification catalyst 4, while referring to a flow chart shown in FIG. 4. FIG. 4 is the flow chart view showing a first temperature raising processing routine. This routine is a routine which has beforehand been stored in the ECU 15, and which is executed every predetermined period of time in a repeated manner. In this embodiment, the ECU 15 carrying out this routine corresponds to a first temperature raising control unit and a second temperature raising control unit in the present invention.

When this routine is carried out, first in step S101, the ECU 15 determines whether there is any temperature raising request with respect to the exhaust gas purification catalyst 4. Specifically, the catalyst temperature TC is estimated based on the output signal of the first temperature sensor 11, and in cases where the estimated temperature is lower than the activation temperature of the exhaust gas purification catalyst 4 (NOx catalyst), a determination is made that there is a temperature raising request. In this step, in cases where a determination is made that there is a temperature raising request, a judgment is made that it is necessary to carry out temperature raising processing with respect to the exhaust gas purification catalyst 4, so the ECU 15 goes to step S102. On the other hand, in cases where a determination is made that there is no temperature raising request to the exhaust gas purification catalyst 4, the ECU 15 once escapes from this routine.

In step S102, the ECU 15 carries out bypass control. Specifically, the ECU 15 calculates a target value of the bypass inflow ratio Rbp in the bypass control from the map shown in FIG. 3 so that the requested amount of fuel addition FUr does not exceed an upper limit amount of fuel addition FUlm. This upper limit amount of fuel addition FUlm is an upper limit value of the amount of fuel addition which has been set so as to suppress the amount of smoke generation Qsm at the time of the fuel ignition control within an allowable range, and can be beforehand set based on empirical rules such as experiments. Then, the ECU 15 controls the degree of opening of the bypass valve 8 in such a manner that the bypass inflow ratio Rbp becomes to be the target value thus calculated. For example, the degree of opening of the bypass valve 8 can also be caused to increase to a full open degree (the largest degree of opening) so as to increase the bypass inflow ratio Rbp at the time of bypass control as much as possible. As a result, the rise of the inflow gas temperature TGc in the bypass control and the decrease of the requested amount of fuel addition FUr in the fuel ignition control can be facilitated as much as possible. After the processing of this step is ended, the ECU 15 advances to step S103.

In step S103, the ECU 15 assigns the bypass inflow ratio Rbp in bypass control into the map shown in FIG. 3. Then, the ECU 15 reads out a value of the requested amount of fuel addition FUr corresponding to the bypass inflow ratio Rbp, and calculates an amount of fuel addition to be added by the fuel addition valve 9 in fuel ignition control. In the following step S104, the ECU 15 carries out the fuel ignition control. In other words, the ECU 15 causes the fuel addition valve 9 to add fuel to an exhaust gas of a low temperature which has flowed out of the turbine 6b. The amount of fuel addition at that time should just be the value calculated in step S103. Then, the ECU 15 causes the glow plug 10 to be ignited at the timing at which a mixed gas, which has been mixed with the fuel added by the fuel addition valve 9, reaches the vicinity of the glow plug 10. As a result, the inflow gas temperature TGc is further raised up due to the combustion of the added fuel, and the catalyst temperature TC goes up to the temperature-raising target temperature TCt. The ECU 15 once escapes from this routine after ending the processing of this step.

As described above, according to the temperature raising system for an exhaust gas purification catalyst in this embodiment, it is possible to reduce the generation of smoke at the time when the added fuel is caused to combust or burn in the fuel ignition control.

<Second Embodiment>

Next, reference will be made to a second embodiment in a practical form of the present invention. The schematic construction of an internal combustion engine and its intake and exhaust systems to which a temperature raising system in this second embodiment is applied is the same as the construction shown in FIG. 1. Hereinafter, the following description will be made by focusing on characteristic portions in the temperature raising system of this embodiment. In this embodiment, the bypass valve 8 is controlled in such a manner that the turbine inflow ratio Rtb at the time of the execution of fuel ignition control becomes larger in comparison with the bypass inflow ratio Rbp, and the bypass valve 8 is also controlled in such a manner that the bypass inflow ratio Rbp after the execution of fuel ignition control becomes larger in comparison with the turbine inflow ratio Rtb.

Figure 5:
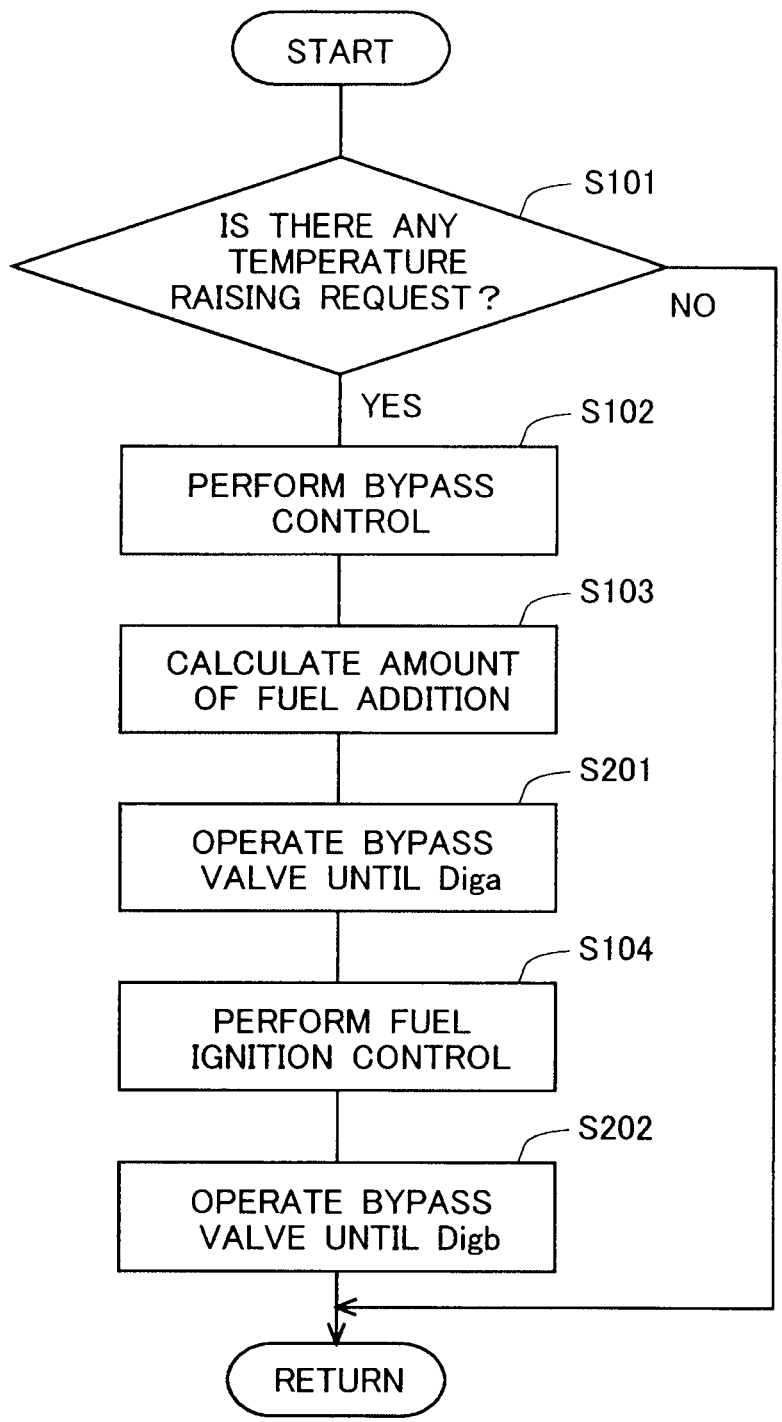
FIG. 5 IS A FLOW CHART VIEW SHOWING A SECOND TEMPERATURE RAISING PROCESSING ROUTINE.

FIG. 5 is a flow chart view showing a second temperature raising processing routine. This routine is a routine which has beforehand been stored in the ECU 15, and which is executed every predetermined period of time in a repeated manner. In this embodiment, the ECU 15 carrying out this routine corresponds to the first temperature raising control unit and the second temperature raising control unit in the present invention. In this routine, for those steps in which the same processings as those in FIG. 4 are carried out, the same symbols are attached and an explanation thereof is omitted.

In step S201, the ECU 15 causes the bypass valve 8 to operate in a valve closing direction up to a target degree of opening Diga at the time of ignition control. The target degree of opening Diga at the time of ignition control is a degree of opening at which the turbine inflow ratio Rtb becomes larger in comparison with the bypass inflow ratio Rbp. When the degree of opening of the bypass valve 8 is decreased from the degree of opening at the time of bypass control to the target degree of opening Diga at the time of ignition control, an amount of exhaust gas (hereinafter referred to as an "amount of glow plug passing gas") passing through the glow plug 10 per unit time increases. For example, zero can be adopted as the target degree of opening Diga at the time of ignition control. In this case, the bypass valve 8 is closed completely, and the passage sectional area of the bypass passage 7 becomes zero. As a result, the bypass inflow ratio Rbp becomes 0, and the turbine inflow ratio Rtb becomes 1.

In the following step S104, the ECU 15 carries out fuel ignition control. In other words, the fuel ignition control is carried out in a state where the amount of glow plug passing gas has increased in comparison with the time when bypass control is carried out, so the heat capacity of the exhaust gas flowing through the periphery of the glow plug 10 increases. As a result, the temperature of combustion gas in the fuel ignition control falls, and the amount of smoke generation Qsm is decreased. In addition, when the amount of glow plug passing gas is caused to increase, the amount of oxygen consumed at the time of combustion ignition control increases, so it is possible to suppress the generation of smoke in a suitable manner.

In step S202, the ECU 15 causes the bypass valve 8 to operate in a valve opening direction up to a target degree of opening Digb after ignition control. This target degree of opening Digb after ignition control is a target opening of the bypass valve 8 after the execution of fuel ignition control, and is a degree of opening at which the bypass inflow ratio Rbp can be made larger in comparison with the turbine inflow ratio Rtb. Accordingly, the target degree of opening Digb after ignition control is set to a degree of opening at the more open side in comparison with the target degree of opening Diga at the time of ignition control (Diga<Digb). In the temperature raising processing in this embodiment, the bypass inflow ratio Rbp is caused to increase in comparison with that at the time of fuel ignition control. As a result of this, a larger amount of exhaust gas, which is maintained at high temperature, can be caused to flow into the exhaust gas purification catalyst 4, thus making it possible to further facilitate the temperature rise of the exhaust gas purification catalyst 4. When the processing of this step ends, the ECU 15 once escapes from this routine.

<Third Embodiment>

Figure 6:
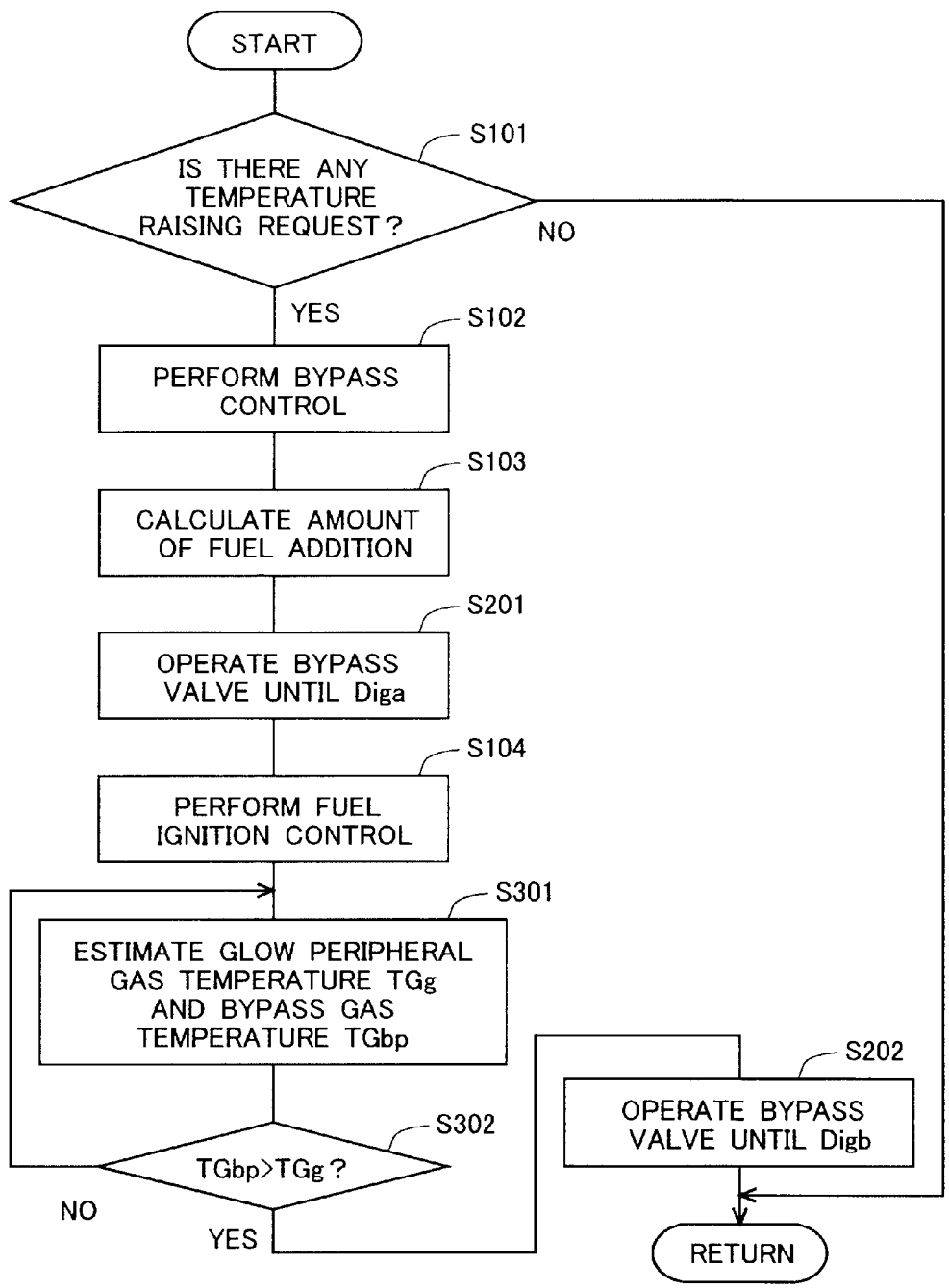
FIG. 6 IS A FLOW CHART VIEW SHOWING A THIRD TEMPERATURE RAISING PROCESSING ROUTINE.

Next, reference will be made to a third embodiment in a practical form of the present invention. The schematic construction of an internal combustion engine and its intake and exhaust systems to which a temperature raising system in this third embodiment is applied is the same as the construction shown in FIG. 1. FIG. 6 is a flow chart view showing a third temperature raising processing routine. This routine is a routine which has beforehand been stored in the ECU 15, and which is executed every predetermined period of time in a repeated manner. In this routine, for those steps in which the same processings as those in FIG. 5 are carried out, the same symbols are attached and an explanation thereof is omitted.

When the execution of fuel ignition control ends in step S104, the ECU 15 advances to step S301. In step S301, the ECU 15 reads in the output signals of the second temperature sensor 12 and the third temperature sensor 13. Then, the ECU 15 estimates the glow peripheral gas temperature TGg based on the output signal of the second temperature sensor 12, and estimates the temperature (hereinafter referred to as a "bypass gas temperature") TGbp of the exhaust gas in the inside of the bypass passage based on the output signal of the third temperature sensor 13.

In step S302, the ECU 15 determines whether the bypass gas temperature TGbp is higher than the glow peripheral gas temperature TGg. Then, in cases where it is determined that the bypass gas temperature TGbp is higher in comparison with the glow peripheral gas temperature TGg (TGbp>TGg), the ECU 15 goes to step S202. That is, the ECU 15 causes the bypass valve 8 to operate in the valve opening direction up to the target degree of opening Digb after ignition control. On the other hand, in cases where it is determined that the bypass gas temperature TGbp is equal to or less than the glow peripheral gas temperature TGg (TGbp≦TGg), the ECU 15 returns to the processing of step S301. That is, the processings of steps S301, S302 are repeatedly carried out until it is determined that the bypass gas temperature TGbp is higher in comparison with the glow peripheral gas temperature TGg.

When the fuel ignition control is executed, a member (exhaust pipe), which forms the exhaust passage, is heated due to the generation of heat in the fuel ignition control. Accordingly, it is considered that immediately after the execution of the fuel ignition control, the glow peripheral gas temperature TGg is maintained at a temperature higher than the bypass gas temperature TGbp. Thus, in the temperature raising processing in this embodiment, the bypass valve 8 is maintained at the target degree of opening Diga at the time of ignition control until the time point at which it is determined that the catalyst temperature TC can be raised by increasing the bypass inflow ratio Rbp more in comparison with the time in which the fuel ignition control is executed. As a result of this, after the execution of the fuel ignition control, it is possible to raise the temperature of the exhaust gas purification catalyst 4 in a more effective manner.

In addition, as a modified form of the above-mentioned control, the ECU 15 may estimate an amount of glow plug passing gas and an amount of passing gas (hereinafter referred to as an "amount of bypass passage passing gas") passing through the bypass passage 7, after the execution of the fuel ignition control, and may estimate, based on these, the timing at which the bypass gas temperature TGbp exceeds the glow peripheral gas temperature TGg. Then, the ECU 15 may change over the degree of opening of the bypass valve 8 to the target degree of opening Digb after ignition control at the timing at which the bypass gas temperature TGbp exceeds the glow peripheral gas temperature TGg.

<Fourth Embodiment>

Figure 7:
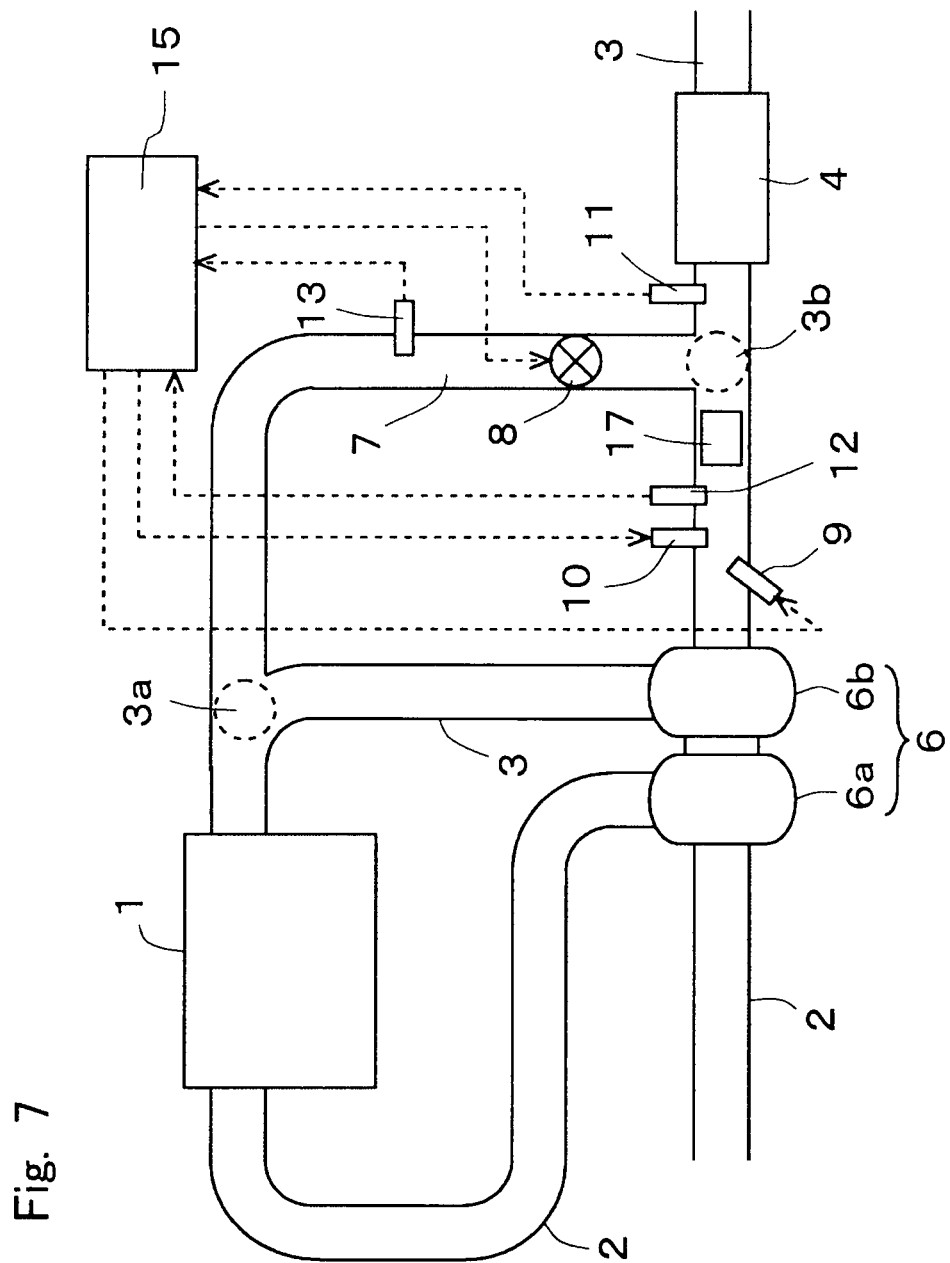
FIG. 7 IS A VIEW SHOWING THE SCHEMATIC CONSTRUCTION OF AN INTERNAL COMBUSTION ENGINE AND ITS INTAKE AND EXHAUST SYSTEMS TO WHICH A TEMPERATURE RAISING SYSTEM FOR AN EXHAUST GAS PURIFICATION CATALYST ACCORDING TO A FOURTH EMBODIMENT OF THE PRESENT INVENTION IS APPLIED.

Next, reference will be made to a fourth embodiment in a practical form of the present invention. FIG. 7 is a view showing the schematic construction of an internal combustion engine and its intake and exhaust systems to which a temperature raising system in this fourth embodiment of the present invention is applied. The same symbols are attached to the components which are common to those in FIG. 1. A reforming catalyst 17, which reforms the fuel contained in an inflowing exhaust gas, is arranged between the glow plug 10 and the bypass merge portion 3b in the exhaust passage 3 in this embodiment.

As described above, because a DPNR catalyst is adopted as the exhaust gas purification catalyst 4, a NOx catalyst is provided thereon. The NOx occlusion capacity of the NOx catalyst has an upper limit, so the ECU 15 carries out control to reduce and purify NOx before a NOx occlusion amount in the NOx catalyst reaches the occlusion capacity thereof. Specifically, the ECU 15 carries out fuel supply control that causes unburnt fuel, which acts as a reducing agent to reduce NOx, to be added from the fuel addition valve 9, and supplies it to the NOx catalyst which is provided on the exhaust gas purification catalyst 4.

Figure 8:
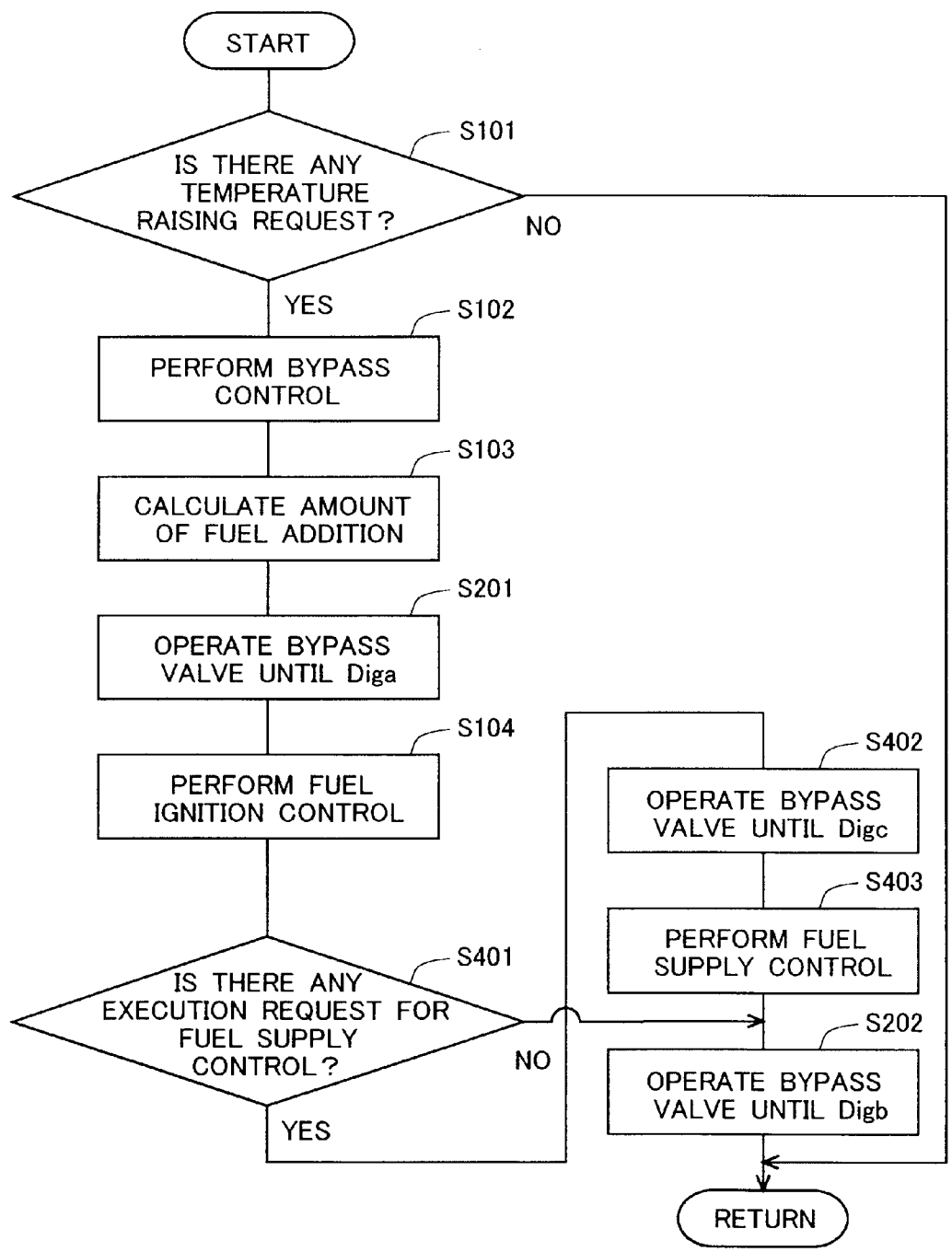
FIG. 8 IS A FLOW CHART VIEW SHOWING A FOURTH TEMPERATURE RAISING PROCESSING ROUTINE.

However, in order to facilitate the reductive reaction of NOx in the NOx catalyst, it is a precondition that the NOx catalyst is in an activated state. For that reason, in cases where the temperature of the NOx catalyst is lower than its activation temperature, it is necessary to first perform temperature raising processing and then to carry out fuel supply control. Hereinafter, reference will be made to a specific processing content which the ECU 15 carries out at the time of shifting from the temperature raising processing to the fuel supply control. FIG. 8 is a flow chart view showing a fourth temperature raising processing routine. This routine is a routine which has beforehand been stored in the ECU 15, and which is executed every predetermined period of time in a repeated manner. In this routine, for those steps in which the same processings as those in FIG. 5 are carried out, the same symbols are attached and an explanation thereof is omitted.

When the execution of fuel ignition control ends in step S104, the ECU 15 advances to step S401. In step S401, the ECU 15 determines whether there is an execution request for executing fuel supply control. The ECU 15 may estimate, for example, an amount of NOx occlusion in the NOx catalyst, and when the amount of NOx occlusion exceeds a specified value, the execution request may be issued. In this step, in cases where it is determined that there is an execution request for fuel supply control, the ECU 15 advances to step S402. On the other hand, in cases where it is determined that there is no execution request for fuel supply control, the ECU 15 advances to step S202. That is, the ECU 15 causes the bypass valve 8 to operate in the valve opening direction from the target degree of opening Diga at the time of ignition control up to the target degree of opening Digb after ignition control.

In step S402, the ECU 15 causes the bypass valve 8 to operate in the valve opening direction from the target degree of opening Diga at the time of ignition control up to a target degree of opening Digc at the time of fuel supply control. This target opening Digc at the time of fuel supply control is a target opening of the bypass valve 8 at the time of fuel supply control. The target degree of opening Digc at the time of fuel supply control in this embodiment is set as a degree of opening at a closed side rather than the target degree of opening Digb after ignition control (Digb>Digc).

Then, in step S403, the ECU 15 carries out fuel supply control by causing the fuel addition valve 9 to add a predetermined amount of fuel to the exhaust gas. Because the execution of the fuel ignition control has already ended, the reforming catalyst 17 is in an activated state with certainty. For that reason, the fuel added from the fuel addition valve 9 is oxidized in part by the catalytic function of the reforming catalyst 17. In this manner, by the fuel thus reformed in the reforming catalyst 17 being supplied to the NOx catalyst, the reductive reaction of NOx occluded in the NOx catalyst can be facilitated in a suitable manner. When the execution of the fuel supply control ends, in step S404, the ECU 15 causes the bypass valve 8 to operate in the valve opening direction from the target degree of opening Digc at the time of fuel supply control up to the target degree of opening Digb after ignition control. When the processing of this step ends, this routine is once escaped.

Here, note that the target opening Digc at the time of fuel supply control may be made to coincide with the target opening Diga at the time of ignition control during the time when fuel ignition control is carried out. In this case, in step S402, the degree of opening of the bypass valve 8 is maintained at the target degree of opening Diga at the time of ignition control. Then, in step S404, the degree of opening of the bypass valve 8 is changed from the target degree of opening Diga at the time of ignition control up to the target degree of opening Digb after ignition control. In addition, the fuel supply control in this embodiment is also carried out at the time when the sulfur poisoning of the NOx catalyst is caused to recover, besides at the time of the reduction of the NOx occluded in the NOx catalyst.

The embodiments described above are only examples for explaining the present invention, and can be subjected to various changes within the scope not departing from the gist of the present invention. In addition, the constructions and control which have been explained in the first through fourth embodiments can be combined with one another as long as such combinations are possible.

[Description of The Reference Signs]
1 internal combustion engine
3 intake passage
3a bypass branch portion
3b bypass merge portion
4 exhaust gas purification catalyst
6 turbocharger
6b turbine
7 bypass passage
8 bypass valve
9 fuel addition valve
10 glow plug
15 ECU

The invention claimed is:

1. A temperature raising system for an exhaust gas purification catalyst comprising:
  a turbine that is arranged in an exhaust passage of an internal combustion engine;
  an exhaust gas purification catalyst that is arranged in a portion in said exhaust passage at the downstream side of said turbine;
  a bypass passage that connects a portion in said exhaust passage between said turbine and said exhaust gas purification catalyst and a portion therein at the upstream side of said turbine with each other;
  a fuel addition valve that is arranged in a portion in said exhaust passage between a downstream side connection portion connected with said bypass passage and said turbine, and adds fuel to an exhaust gas flowing through said exhaust passage;
  an ignition device that is arranged in a portion in said exhaust passage between said downstream side connection portion and said turbine, and ignites the added fuel which has been added by said fuel addition valve;
  a first temperature raising control unit that causes the exhaust gas having bypassed said turbine to flow into said exhaust gas purification catalyst through said bypass passage, at the time when a request for raising the temperature of said exhaust gas purification catalyst is made; and
  a second temperature raising control unit that executes fuel ignition control in which said fuel addition valve is caused to add fuel to the exhaust gas which has flowed out of said turbine, and said ignition device is caused to ignite the added fuel, at the time when the request for raising the temperature of said exhaust gas purification catalyst is made.

2. The temperature raising system for an exhaust gas purification catalyst as set forth in claim 1, further comprising:
  an inflow ratio changing device that is able to change a bypass inflow ratio, which is a ratio of an amount of exhaust gas flowing into said bypass passage with respect to a total amount of exhaust gas discharged from said internal combustion engine, and a turbine inflow ratio, which is a ratio of an amount of exhaust gas flowing into said turbine with respect to the total amount of exhaust gas;

wherein said first temperature raising control unit controls said inflow ratio changing device in such a manner that the turbine inflow ratio at the time when fuel ignition control is carried out becomes larger in comparison with the bypass inflow ratio, and also controls said inflow ratio changing device in such a manner that the bypass inflow ratio after the fuel ignition control has been carried out becomes larger in comparison with the turbine inflow ratio.

* * * * *